United States Patent [19]
Lind et al.

[11] Patent Number: 6,163,694
[45] Date of Patent: Dec. 19, 2000

[54] METHOD AND APPARATUS FOR STANDBY STATE CELL SELECTION IN A CELLULAR TELEPHONE SYSTEM

[75] Inventors: Torsten Lind; Lars Johansson, both of Linköping; Anders Fransson, Norrköping, all of Sweden

[73] Assignee: Telefonaktiebolaget L M Ericsson (publ), Stockholm, Sweden

[21] Appl. No.: 08/917,578

[22] Filed: Aug. 22, 1997

[51] Int. Cl.[7] .................................................. H04Q 7/00
[52] U.S. Cl. ........................................ 455/422; 455/33.4
[58] Field of Search .................................. 455/33.1, 33.4, 455/33.2, 54.1, 56.1, 62, 63, 434, 435; 379/59

[56] References Cited

U.S. PATENT DOCUMENTS

| | | |
|---|---|---|
| 4,144,411 | 3/1979 | Frenkiel . |
| 5,345,499 | 9/1994 | Benveniste . |
| 5,404,355 | 4/1995 | Raith ...................................... 370/95.1 |
| 5,499,386 | 3/1996 | Karlsson . |
| 5,574,971 | 11/1996 | Aihara . |
| 5,603,081 | 2/1997 | Raith et al. ............................ 455/33.1 |
| 5,627,881 | 5/1997 | Fletcher . |
| 5,633,915 | 5/1997 | Yang . |
| 5,701,586 | 12/1997 | Talbbane et al. ....................... 455/33.4 |
| 5,778,316 | 7/1998 | Persson et al. ......................... 455/434 |
| 5,842,128 | 11/1998 | Kito et al. .............................. 455/435 |

FOREIGN PATENT DOCUMENTS

WO 96/06512  2/1996  WIPO .

OTHER PUBLICATIONS

European Patent Office, Standard Search Report, May 25, 1998, File No. RS 100037 US.
PCT International Search Report, Dec. 1, 1998, PCT/SE 98/01486.

Primary Examiner—Wellington Chin
Assistant Examiner—Pablo Tran
Attorney, Agent, or Firm—Jenkens & Gilchrist, P.C.

[57] ABSTRACT

In an effort to have a mobile station choose a lowest level cell to lock onto, a method and apparatus for standby state cell selection in a layered cellular telephone system is proposed. Upon entering a standby state, the mobile station is provided with parameters containing a value for a minimum threshold downlink signal strength level and information pertaining to hierarchical levels associated with a plurality of cells within the cellular telephone system. The mobile station measures downlink signal strengths of a plurality of radio frequencies transmitted by the plurality of cells and selects a cell having a lowest level in the hierarchy of cells which transmits a radio frequency having a greatest downlink signal strength, the downlink signal further having a signal strength above the minimum threshold level.

17 Claims, 3 Drawing Sheets

METHOD AND APPARATUS FOR STANDBY STATE CELL SELECTION IN A CELLULAR TELEPHONE SYSTEM

BACKGROUND OF THE INVENTION

1. Technical Field of the Invention

The present invention pertains in general to the selection of a cell in a cellular telephone system and, more particularly, to a method and apparatus for selection of a standby state cell in a cellular telephone system having a layered cell architecture.

2. Description of Related Art

The following descriptions use the Global System for Mobile communication (GSM) protocol by way of example. It is understood, however, that the issues, concepts and solutions provided by the present invention also apply to other wireless communication systems and protocols.

In cellular telephone systems a geographic service area is divided into a plurality of individual regions referred to as cells, each of which is provided with cellular telephone service on a plurality of separate communication channels the frequencies of which are reused among different cells separated from one another such that there is a sufficiently low level of interference between them. When a mobile station operating within the cellular telephone system is in a standby state, for example immediately after powering up, it searches for a cell and its associated broadcast control channel to lock onto. To select a cell, the mobile station scans radio frequencies in the cellular telephone system and measures downlink signal strength levels for each of them. The mobile station tunes to the strongest carrier frequency and determines if it is a broadcast control channel. If so, the mobile station locks onto the broadcast control channel associated with the cell. If the carrier is determined not to be a broadcast control channel, the mobile station tunes to the second strongest carrier and repeats the process. In such a fashion, the mobile station eventually locks onto the cell with the strongest broadcast control channel downlink signal strength.

As the demand for cellular telephone service increases over time, the capacity of existing systems has been severely stressed to serve all the subscribers who desire cellular telephone service, particularly in major metropolitan areas. For example, in the area in and around a convention center, the number of mobile stations may be so great that the demands for service cannot be satisfied by the entire channel capacity of the base station serving the cell within which the convention center is located. In such situations, additional "layers" of cellular telephone service is provided by additional lower powered base stations located within an existing, so-called "umbrella," or "macro" cell, and referred to as "microcells". Such microcells may have a coverage or service area on the order of a few hundred meters in contrast to a few kilometers of coverage of the overlying umbrella cell. A plurality of such microcells may be located adjacent to one another and form a contiguous coverage area of substantial width all of which is within the overall coverage area of the umbrella cell. Alternatively, they may be separated from one another within the umbrella cell.

When a layered cell structure is used, there is provided an enhanced level of service capacity which can be configured for individual circumstances and which provides an assurance that users can receive service despite an extremely high demand within a very small geographic area. Moreover, additional layers of cellular telephone service may be added, for example, by a plurality of either contiguous or separated "picocells" positioned within the service area of the individual microcells, each of which are in turn within the overall umbrella cell. The base stations providing the cellular telephone service within the picocells are of even still lower power than the base stations serving the microcells and have a service area of, for example, a few hundred meters to provide coverage within a single building or a single floor within a large convention center.

In layered cell architectures, many more options are available to a mobile station when selecting a cell to lock onto. For example, the mobile station may receive cellular telephone service at any given moment from either a picocell base station, a microcell base station, or an umbrella cell base station. When conventional criteria for standby state cell selection in a single layered cellular telephone system architecture is applied to a layered architecture, the results are less than ideal. When standby state cell selection is performed in a single layer cellular telephone system architecture, the principle criterion used is the strength of the downlink signal received by the mobile station from the respective base station broadcast control channel. In a layered architecture the strongest broadcast control channel is most likely to be associated with the highest level layer or umbrella cell since the umbrella cell transmits with the greatest power to serve a relatively large geographic area. In a layered architecture, however, it is undesirable for a mobile station to lock onto the highest level layer cell since it is generally preferable to serve the mobile station with the lowest possible layer cell for capacity reasons.

In order to maximize capacity of the cellular telephone system, mobile stations are typically instructed by the cellular telephone system to place and receive telephone calls on the lowest level cell possible. Thus, if sufficient signal quality exists from a lower level cell, such as a microcell or picocell, it is preferred to serve the mobile station from that cell rather than the umbrella cell which has fewer total channels available for service as compared to lower level cells given the geographical size of the service area. Using the conventional single layer standby state cell selection, however, the mobile station locks onto a higher level cell than is desirable for carrying a telephone call. Thus when the mobile station places or receives the telephone call using the conventional criteria for standby state cell selection for a single layer cellular telephone architecture in a layered cellular telephone architecture, the cellular telephone system performs a handover from the higher level cell which the mobile station has selected to a lower level cell. The handover increases processor capacity requirements and slows down the call setup procedure.

Because of the foregoing problems associated with the use of the existing standby state cell selection method within layered cellular telephone system architectures, it is desirable to introduce a method and apparatus for standby state cell selection which maximizes the efficient utilization of channel availability within a layered cellular telephone system. The system of the present invention provides such a method and apparatus.

SUMMARY OF THE INVENTION

The present invention comprises a method and apparatus for standby state cell selection in a layered cellular telephone system. Upon entering a standby state, a mobile station is provided with parameters containing a value for a minimum threshold downlink signal strength level and information pertaining to hierarchical levels associated with a plurality of cells within the cellular telephone system. The mobile station measures downlink signal strengths of a plurality of radio frequencies transmitted by base stations associated with plurality of cells and selects a cell having a lowest level in the hierarchy of cells which transmits a radio frequency having a greatest downlink signal strength, the downlink signal further having a signal strength above the minimum threshold level.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
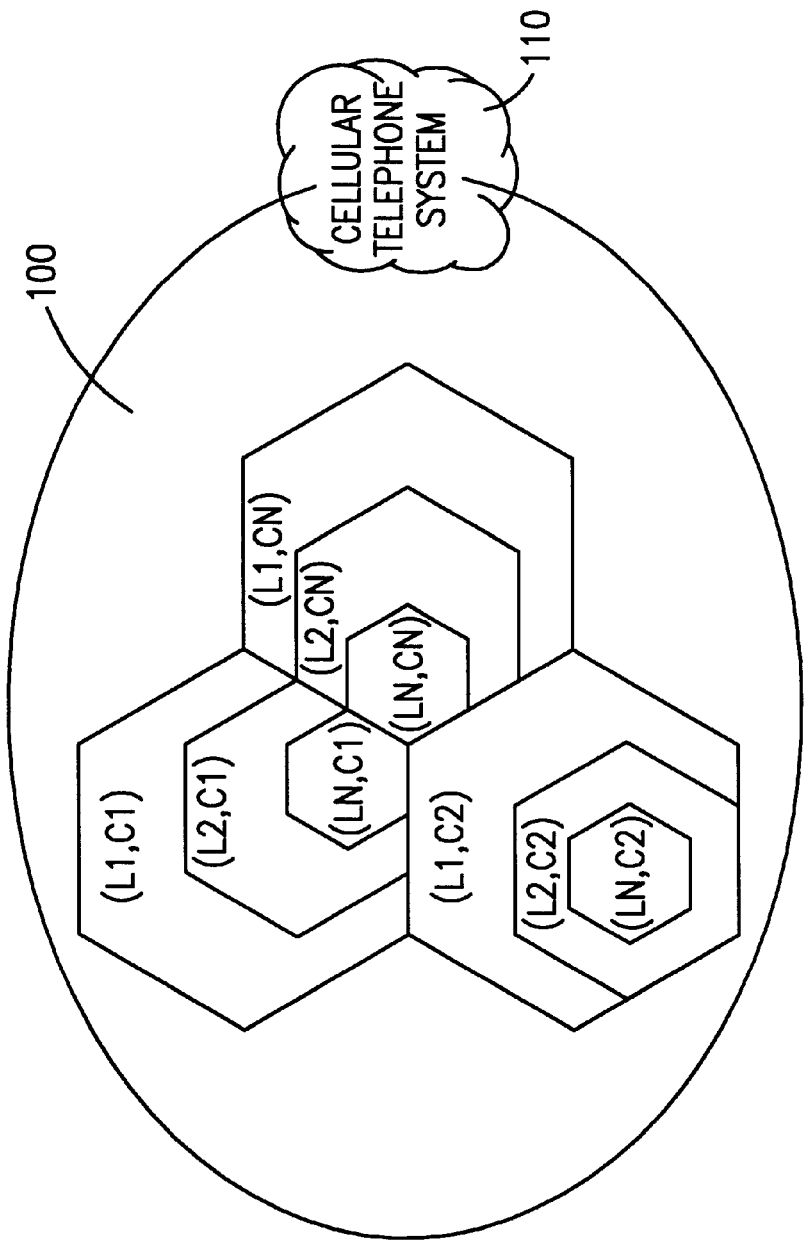
FIG. 1 is a pictorial representation of a layered cellular telephone system service area.

Referring now to FIG. 1, there is illustrated a pictorial representation of a layered cellular telephone system service area. A service area 100 of a layered or hierarchical architecture cellular telephone system 110 comprises a plurality of cells C1–CN having a plurality of hierarchical levels L1–LN. The highest hierarchical level of cells (L1,C1–CN) are referred to as umbrella or macro cells. Umbrella cells (L1,C1–CN) are served by base stations (not shown) which typically transmit with the greatest power, cover the widest service area, and have the lowest number of communication channels per geographical service area as compared to lower hierarchical level cells (L2–N,C1–CN).

At the next lower hierarchical level are microcells (L2, C1–CN). The microcells (L2,C1–CN) are served by base stations (not shown) which typically transmit at a power level lower than the umbrella cells (L1,C1–CN) but greater than lower level cells (L3–N,C1–CN), cover a service area smaller than the umbrella cells (L1,C1–CN) but larger than lower level cells (L3–N,C1–CN), and have a greater number of communication channels per geographical service area than umbrella cells (L1,C1–CN) but fewer than lower level cells (L3–N,C1–CN).

Although any number of hierarchical levels are possible, the lowest hierarchical level cells are typically referred to as picocells (LN,C1–CN). Picocells (LN,C1–CN) are served by base stations (not shown) which typically transmit with the weakest power as compared to higher level cells (L1–(N–1),C1–CN), cover the smallest service area as compared to higher level cells (L1–(N–1),C1–CN), and have the greatest number of communication channels per geographical service area as compared to higher level cells (L1–(N–1), C1–CN).

Figure 2:
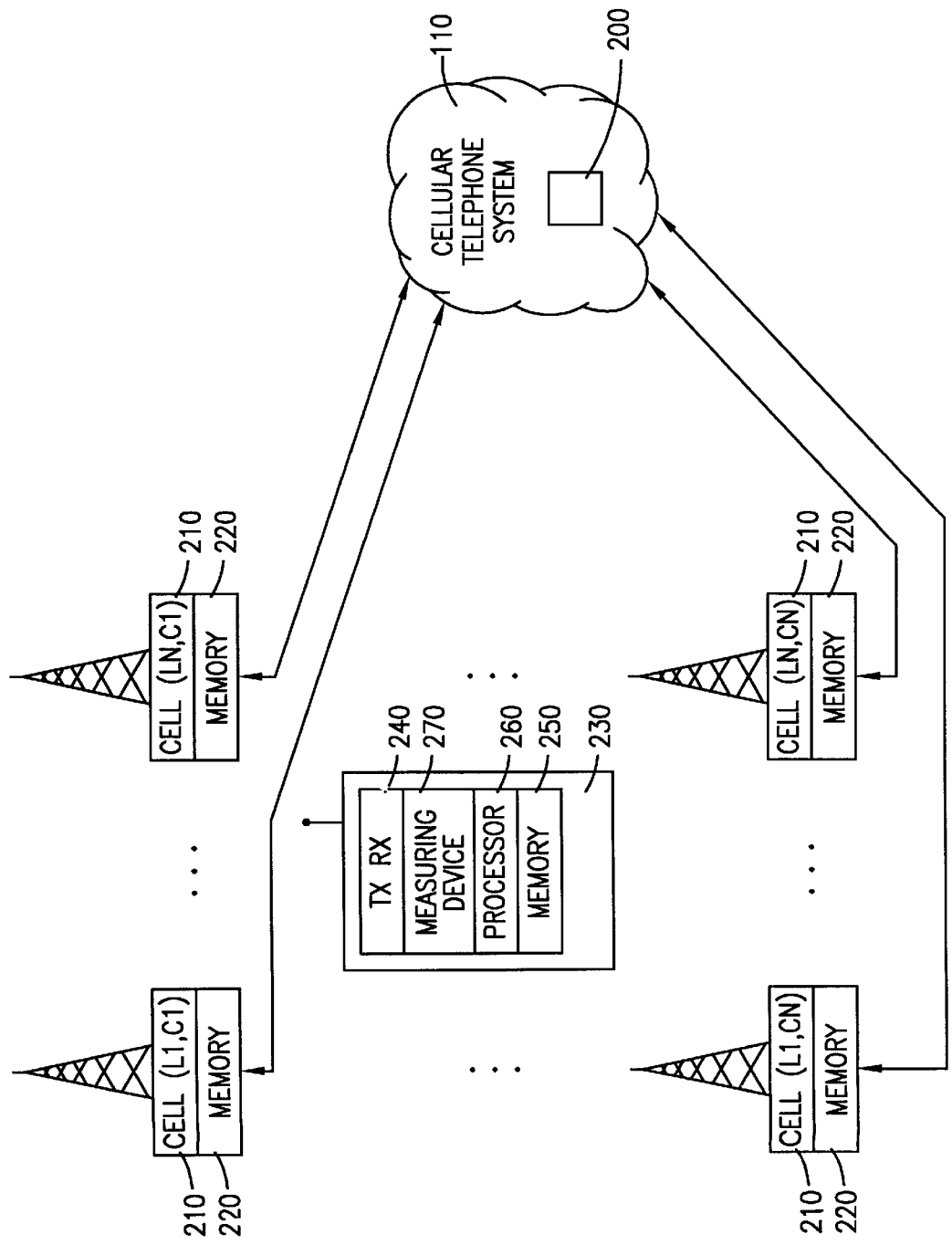
FIG. 2 is a functional block diagram of a plurality of base stations and a mobile station for performing standby state cell selection in a manner consistent with the present invention.

Referring additionally now to FIG. 2, there is illustrated a functional block diagram of a plurality of base stations and a mobile station for performing standby state cell selection in a manner consistent with the present invention. The cellular telephone system 110 stores information pertaining to hierarchical levels associated with the plurality of cells (L1–N,C1–N) in a memory 200. Each of the cells (L1–N, C1–N) is served by a base station 210 having a memory 220.

Each of the base stations 210 communicates with the cellular telephone system 110 and receives operating parameters from the cellular telephone system 110. A first parameter contains information pertaining to hierarchical levels associated with the plurality of cells (L1–N,C1–N). In a preferred embodiment of the present invention, each cell (L1–N,C1–N) is provided with hierarchical information pertaining to that particular cell while in an alternative embodiment, each cell (L1–N,C1–N) is provided with hierarchical information pertaining to every cell (L1–N,C1–N).

A second parameter is received by the base station 210 containing a value representing a minimum threshold downlink signal strength level. The threshold value represents a minimum downlink signal strength of a radio frequency transmitted by the base station 210 of a cell which is necessary in order for a mobile station to lock onto the cell and its associated broadcast control channel.

FIG. 2, further illustrates a mobile station 230 subscribing to cellular telephone service provided by the cellular telephone system 110. The mobile station 230 comprises functionality normally present in a mobile station including a transceiver 240. The mobile station 230 also includes a memory 250, a processor 260 and a device 270 for measuring the downlink signal strength of signals transmitted by the base stations 210 serving the plurality of cells (L1–N, C1–N).

When the mobile station 230 enters a standby state, for example after powering up, the mobile station 230 searches for a cell and its associated broadcast control channel to lock onto. The mobile station 230 is provided with the first parameter and the second parameter. In a preferred embodiment, the parameters are transmitted from the cellular telephone system 110 to the mobile station 230 via radio frequencies transmitted by the base stations 210. While the parameters can be transmitted on any communication channel of the cellular telephone system 110, in the preferred embodiment the parameters are transmitted on a control channel of each cell (L1–N,C1–N). In particular, in a Global System for Mobile communication (GSM) based cellular telephone system, the parameters are transmitted on a broadcast control channel of each cell (L1–N,C1–N).

In a first alternative embodiment, the parameters for all cells (L1–N,C1–N) are broadcast to all mobile stations 230 which are in the standby state on a single radio frequency. In a second alternative embodiment, the parameters are received by the mobile station 230 from the cellular telephone system 110 and stored by the processor 260 of the mobile station 230 in the memory 250 while the mobile station 230 is in an initial standby state. The parameters are then used during the initial and subsequent standby states. In a third alternative embodiment, the memory 250 of the mobile station 230 is preprogrammed with the parameters.

In any event, the mobile station 230 is provided with the parameters and the transceiver 240 tunes to a plurality of radio frequencies transmitted by the base stations 210 of the plurality of cells (L1–N,C1–N). The processor 260 uses the information pertaining to the hierarchical level of cells (L1–N,C1–N) within the cellular telephone system 110 to identify the lowest level cells and instructs the device 270 to measure the downlink signal strength of the plurality of radio frequencies transmitted by the base stations 210 of the lowest level cells. The processor 260 compares the measurements against one another and against the minimum threshold signal strength level and instructs the mobile station 230 to lock onto the cell and its associated broadcast control channel having the greatest measured downlink signal strength which is also above or equal to the minimum threshold signal strength level. If no cell meets these criteria, the processor 260 repeats the process for cells on successively higher hierarchical levels until a cell is selected.

Figure 3:
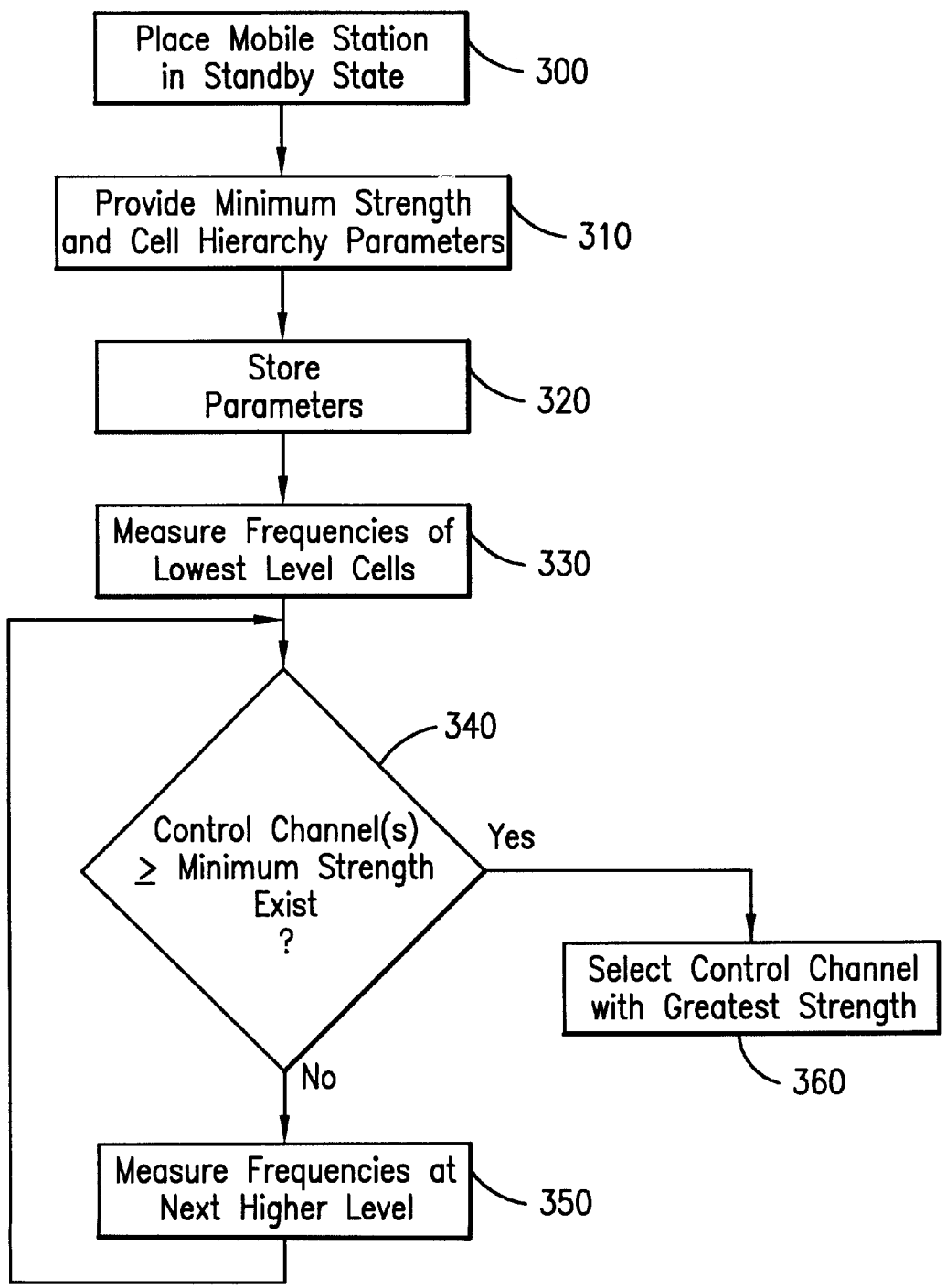
FIG. 3 is a flow diagram of a method for performing standby state cell selection in a manner consistent with the present invention.

Referring now to FIG. 3, there is illustrated a flow diagram of a method for standby state cell selection in a cellular telephone system consistent with the present invention. A mobile station is placed in standby state (step 300), for example by powering up the mobile station. The mobile station is provided with parameters (step 310) containing information pertaining to hierarchical levels of a plurality of cells comprising the cellular telephone system and a minimum threshold downlink signal strength needed for selection by the mobile station and stored in the mobile station (step 320). In a preferred embodiment, the parameters are transmitted from the cellular telephone system to the mobile station via radio frequencies transmitted by base stations associated with the plurality of cells. While the parameters can be transmitted on any communication channel of the cellular telephone system, in the preferred embodiment the parameters for an individual cell are transmitted on a control channel of that cell. In particular, in a Global System for Mobile communication (GSM) based cellular telephone system, the parameters are transmitted on the broadcast control channel of each cell.

In a first alternative embodiment, the parameters for all cells are broadcast to all mobile stations, on a single radio frequency, which are in the standby state. In a second alternative embodiment, the parameters are received by the mobile station from the cellular telephone system and stored in a memory of the mobile station while the mobile station is in an initial standby state. The parameters are then used during the initial and subsequent standby states. In a third alternative embodiment, the mobile station is preprogrammed with the parameters.

In any event, the mobile station uses the information pertaining to the hierarchical level of cells within the cellular telephone system to identify the lowest level cells and measures the downlink signal strength of a plurality of radio frequencies transmitted by the base stations of the lowest level cells (step 330). A determination is made to identify if any of the radio frequencies having a measured downlink signal strength level greater than or equal to the minimum threshold level is a control channel (step 340). If no radio frequencies meet these criteria, the mobile station uses the information pertaining to the hierarchical level of cells within the cellular telephone system to identify cells at the next higher level and measures the downlink signal strength of a plurality of radio frequencies transmitted by the base stations of these cells (step 350) and a new determination is made in step 340. Once a radio frequency having a measured downlink signal strength level greater than or equal to the minimum threshold level which is also a control channel is identified in step 340, the mobile station selects the cell associated with the radio frequency and locks onto the cell and its associated control channel (step 360).

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for standby state cell selection in a layered cellular telephone system comprising the steps of:

providing a mobile station in a standby state and prior to an initial cell selection with parameters containing a minimum threshold downlink signal strength level and information pertaining to hierarchical levels associated with a plurality of cells within the cellular telephone system;

measuring downlink signal strengths of a plurality of radio frequencies transmitted by the plurality of cells; and making an initial cell selection of a cell having a lowest level in the hierarchy of cells which transmits a radio frequency having a greatest downlink signal strength, the downlink signal further having a signal strength above the minimum threshold level.

2. The method recited in claim 1, wherein the radio frequency is a carrier frequency for a control channel of the cell.

3. The method recited in claim 2, wherein the radio frequency is a broadcast control channel.

4. The method recited in claim 1, including placing the mobile station in the standby state by powering up the mobile station.

5. The method recited in claim 1, wherein the step of providing the mobile station with parameters, comprises the step of preprogramming the parameters into a memory of the mobile station.

6. The method recited in claim 1, wherein the step of providing the mobile station with parameters, comprises the step of transmitting the parameters associated with each of the respective cells on radio frequencies transmitted by the respective cells.

7. The method recited in claim 6, further including the steps of:

receiving the parameters when the mobile station is in the initial standby state; and storing the parameters within the mobile station for use during subsequent standby states.

8. The method recited in claim 1, wherein the step of providing the mobile station with parameters, comprises the step of broadcasting the parameters to a plurality of mobile stations in the standby state.

9. Apparatus for standby state cell selection in a layered cellular telephone system comprising:

a measuring device within a mobile station for measuring signal strengths of downlink signals transmitted by a plurality of cells in the cellular telephone system;

a processor within the mobile station for receiving information pertaining to hierarchial levels associated with the plurality of cells within the cellular telephone system prior to an initial cell selection, the processor further for receiving a minimum threshold downlink signal strength value from the cellular telephone system, the processor still further for making an initial cell selection of a cell having a lowest level in the hierarchy of cells which transmits a radio frequency having a greatest downlink signal strength as measured by the measuring device, the downlink signal further having a signal strength above the minimum threshold level; and a memory within the mobile station for storing the hierarchial information pertaining to the plurality of cells and the minimum threshold downlink signal strength received by the processor.

10. A method for standby state cell selection in a layered cellular telephone system comprising the steps of:

providing the mobile station in a standby state and prior to an initial cell selection with parameters containing a minimum threshold downlink signal strength level and information pertaining to hierarchical levels associated with a plurality of cells within the cellular telephone system prior to an initial cell selection;

measuring downlink signal strengths of the radio frequencies transmitted by cells having the lowest level in the hierarchy of cells;

making an initial selection of the cell having the greatest downlink signal strength if the signal strength is above the minimum threshold level; otherwise performing the steps of:

measuring downlink signal strengths of the radio frequencies transmitted by cells having a next higher level in the hierarchy of cells; and repeating step of making an initial selection of the cell.

11. The method recited in claim 10, wherein one said radio frequency is a carrier frequency for a control channel of the cell.

12. The method recited in claim 11, wherein the one radio frequency is a broadcast control channel.

13. The method recited in claim 10, including placing the mobile station in the standby state by powering up the mobile station.

14. The method recited in claim 10, wherein the step of providing the mobile station with parameters, comprises the step of preprogramming the parameters into a memory of the mobile station.

15. The method recited in claim 10, wherein the step of providing the mobile station with parameters, comprises the step of transmitting the parameters associated with each of the respective cells on radio frequencies transmitted by the respective cells.

16. The method recited in claim 15, further including the steps of:

receiving the parameters when the mobile station is in the initial standby state; and storing the parameters within the mobile station for use during subsequent standby states.

17. The method recited in claim 10, wherein the step of providing the mobile station with parameters, comprises the step of broadcasting the parameters to a plurality of mobile stations in the standby state.

* * * * *